(12) United States Patent
Inbar et al.

(10) Patent No.: US 12,248,373 B2
(45) Date of Patent: Mar. 11, 2025

(54) DATA STORAGE DEVICE AND METHOD FOR ENHANCED RECOVERY THROUGH A HARDWARE RESET OF ONE OF ITS DISCRETE COMPONENTS

(71) Applicant: Western Digital Technologies, Inc., San Jose, CA (US)

(72) Inventors: Karin Inbar, Kfar Saba (IL); Avichay Hodes, Kfar Ben Nun (IL); Alexander Bazarsky, Holon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 57 days.

(21) Appl. No.: 18/223,122

(22) Filed: Jul. 18, 2023

(65) Prior Publication Data

US 2024/0296097 A1 Sep. 5, 2024

Related U.S. Application Data

(60) Provisional application No. 63/449,770, filed on Mar. 3, 2023.

(51) Int. Cl.
| | |
|---|---|
| *G06F 11/00* | (2006.01) |
| *G06F 11/07* | (2006.01) |
| *G06F 11/14* | (2006.01) |
| *G06F 11/30* | (2006.01) |

(52) U.S. Cl.
CPC ........ *G06F 11/1441* (2013.01); *G06F 11/076* (2013.01); *G06F 11/0793* (2013.01); *G06F 11/3058* (2013.01)

(58) Field of Classification Search
CPC ............... G06F 11/076; G06F 11/0793; G06F 11/1441; G06F 3/0362
See application file for complete search history.

(56) References Cited

U.S. PATENT DOCUMENTS

| | | | |
|---|---|---|---|
| 9,239,759 B2 | 1/2016 | Billing et al. | |
| 10,666,264 B1 | 5/2020 | Brewer | |
| 11,048,597 B2 | 6/2021 | Eno et al. | |
| 2003/0093721 A1* | 5/2003 | King | G11B 25/043 |
| | | | 714/42 |
| 2011/0271036 A1* | 11/2011 | Cheng | G06F 1/24 |
| | | | 711/E12.001 |
| 2017/0115891 A1* | 4/2017 | O'Krafka | G06F 3/0629 |
| 2018/0349301 A1 | 12/2018 | Canepa | |

(Continued)

FOREIGN PATENT DOCUMENTS

KR 20190073768 A 6/2019

*Primary Examiner* — Marc Duncan
(74) *Attorney, Agent, or Firm* — Crowell & Moring LLP

(57) ABSTRACT

A data storage device and method for enhanced recovery through data storage device discrete-component-hardware-reset are provided. In one embodiment, the data storage device determines that a subset of a plurality of memory dies is non-responsive, sends a request to a host to accept longer delays associated with the subset of the plurality of memory dies, power-cycles the subset of the plurality of memory dies, and then informs the host that the latency associated with those dies has been restored to normal latency or that the subset of the plurality of memory dies are inactive (in case of unsuccessful recovery). Other embodiments are possible, and each of the embodiments can be used alone or together in combination.

20 Claims, 8 Drawing Sheets

(56) References Cited

U.S. PATENT DOCUMENTS

| | | |
|---|---|---|
| 2019/0079836 A1 | 3/2019 | Miller et al. |
| 2019/0228810 A1 | 7/2019 | Jones et al. |
| 2020/0042452 A1* | 2/2020 | Palmer ................ G06F 13/1668 |
| 2020/0058363 A1 | 2/2020 | Jeddeloh |
| 2020/0210073 A1 | 7/2020 | Palmer |
| 2021/0390022 A1* | 12/2021 | Siluvainathan ....... G06F 3/0607 |
| 2023/0393955 A1* | 12/2023 | Mason ............... G11C 29/4401 |
| 2024/0176714 A1* | 5/2024 | Diao ..................... G11C 29/52 |

* cited by examiner

DATA STORAGE DEVICE AND METHOD FOR ENHANCED RECOVERY THROUGH A HARDWARE RESET OF ONE OF ITS DISCRETE COMPONENTS

CROSS-REFERENCE TO RELATED APPLICATION

This application claims priority to U.S. provisional patent application No. 63/449,770, filed Mar. 3, 2023, which is hereby incorporated by reference.

BACKGROUND

As storage utilization in enterprise and in the cloud is growing, the need for data corrections methods and high-reliability data storage devices is only intensifying. Some data storage device controllers uses various data protection mechanisms to help guarantee a low read-failure rate and that data returned to a host does not contain integrity errors. bit-error rate (UBER) or mean time between failures (MTBF).

DETAILED DESCRIPTION

Overview

Figure 1A:
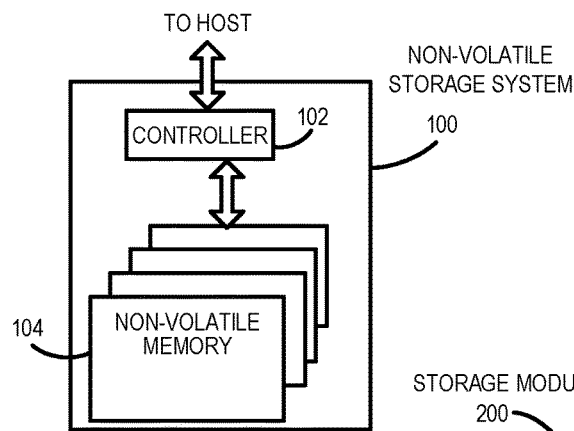
FIG. 1A is a block diagram of a data storage device of an embodiment.

By way of introduction, the below embodiments relate to a data storage device and method for enhanced recovery through a hardware reset of one of its discrete components. In one embodiment, a data storage device is provided comprising: a plurality of memory dies; and a controller. The controller is configured to: in response to determining that a subset of the plurality of memory dies is non-responsive, inform a host that the data storage device will perform a hardware reset on the subset of the plurality of memory dies; in response to receiving an acknowledgment from the host, perform the hardware reset on the subset of the plurality of memory dies; and inform the host after the hardware reset on the subset of the plurality of memory dies has been performed.

In some embodiments, the hardware reset is initiated by the data storage device and not the host.

In some embodiments, the subset of the plurality of memory dies is hardware reset without clearing host input-output queue(s) for the subset of the plurality of memory dies.

In some embodiments, the controller is further configured to receive, from the host, a memory access command redirected from the subset of the plurality of memory dies to another memory die of the plurality of memory dies.

In some embodiments, the controller is further configured to perform the hardware reset on the subset of the plurality of memory dies by: sending a command to all memory dies of the plurality of memory dies to ignore a hardware reset command, wherein because the subset of the plurality of memory dies is non-responsive, the subset of the plurality of memory dies does not receive the command to ignore the hardware reset command; and sending the hardware reset command on a communication channel shared by the plurality of memory dies.

In some embodiments, the controller is further configured to: determine whether the subset of the plurality of memory dies was found to be non-responsive more than a threshold number of times over a time period; in response to determining that the subset of the plurality of memory dies was not found to be non-responsive more than the threshold number of times over the time period, perform the hardware reset on the subset of the plurality of memory dies; and in response to determining that the subset of the plurality of memory dies was found to be non-responsive more than the threshold number of times over the time period, retire the subset of the plurality of memory dies.

In some embodiments, the controller is further configured to inform the host that the data storage device will perform the hardware reset in response to determining that the host has enabled an enhanced recovery operation.

In some embodiments, the subset of the plurality of memory dies comprises a single memory die.

In some embodiments, the subset of the plurality of memory dies comprises more than one memory die.

In some embodiments, the plurality of memory dies comprises three-dimensional memory dies.

In another embodiment, a method is provided that is performed in a data storage device in communication with a host. The method comprises: determining that a component in the data storage device needs to be hardware reset; informing the host that the data storage device will perform a hardware reset of the component; performing the hardware reset of the component; and informing the host after the hardware reset of the component has been performed.

In some embodiments, the component comprises a memory die.

In some embodiments, the component comprises part of a controller of the data storage device.

In some embodiments, the component comprises one or more of: dynamic random access memory (DRAM), electrically erasable programmable read only memory (EEPROM), a component in an application specific integrated circuit (ASIC), a capacitor, and a bus controller.

In some embodiments, the data storage device determines that the component needs to be hardware reset in response to determining that the component is non-responsive.

In some embodiments, the data storage device determines that the component needs to be hardware reset in response to determining that the component exhibits irregular power usage.

In some embodiments, the data storage device determines that the component needs to be hardware reset in response to determining that the component exhibits a certain read and/or write latency profile.

In some embodiments, the method further comprises receiving an instruction from the host to enable functionality in the data storage device to hardware reset the component.

In some embodiments, the component is hardware reset by the data storage device and not the host.

In another embodiment, a data storage device is provided comprising: a plurality of memory dies; means for determining that one or more memory dies of the plurality of memory dies are non-functional; means for informing a host in communication with the data storage device that an enhanced recovery operation will be performed on the one or more memory dies so a response to a host command might be delayed; and means for performing the enhanced recovery operation on the one or more memory dies.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
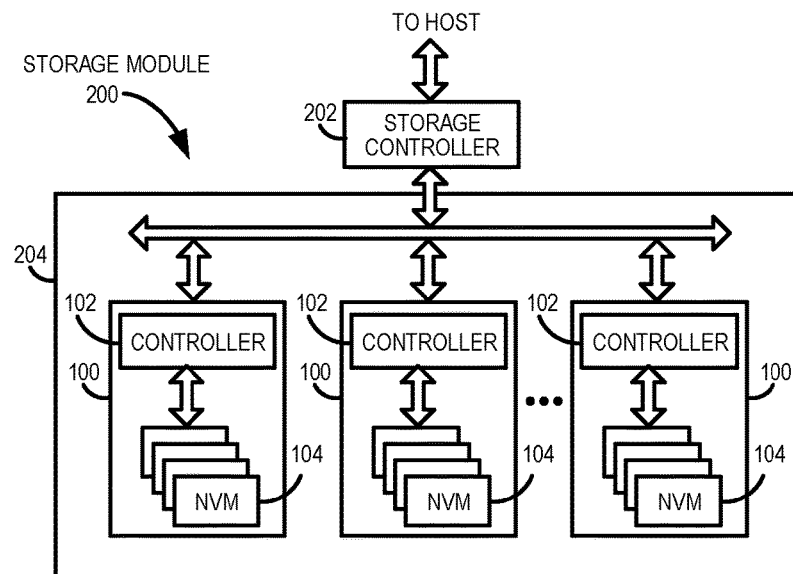
FIG. 1B is a block diagram illustrating a storage module of an embodiment.
Figure 1C:
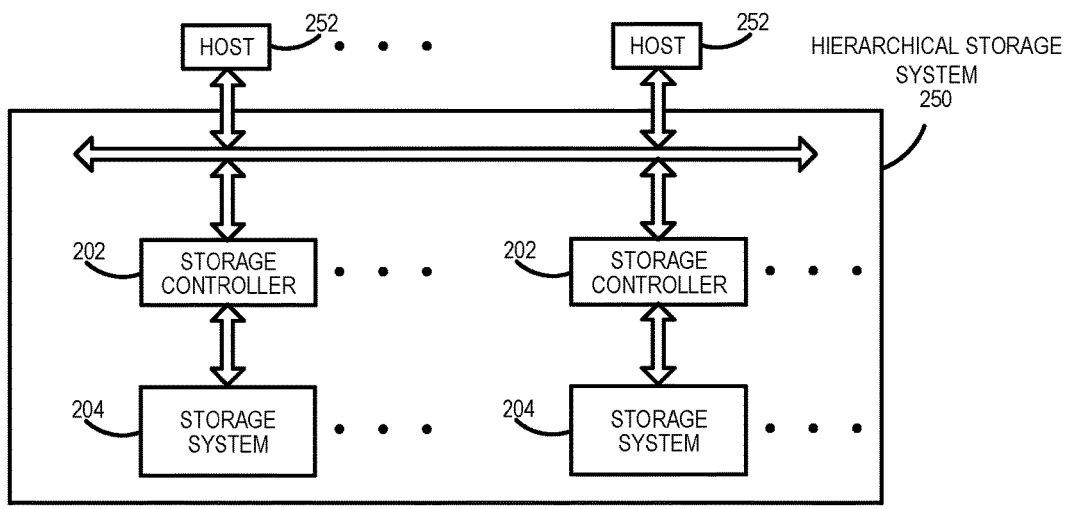
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
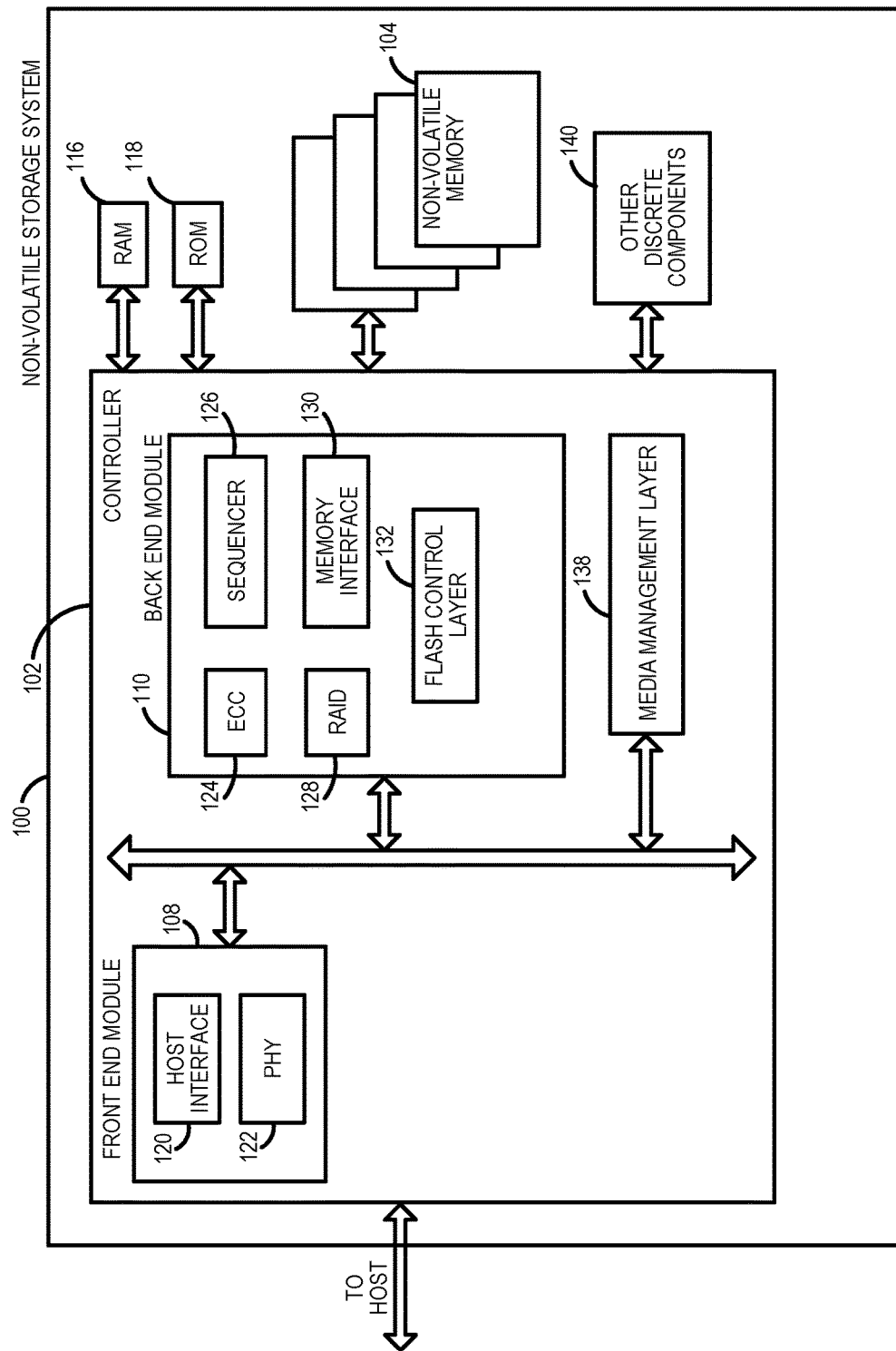
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
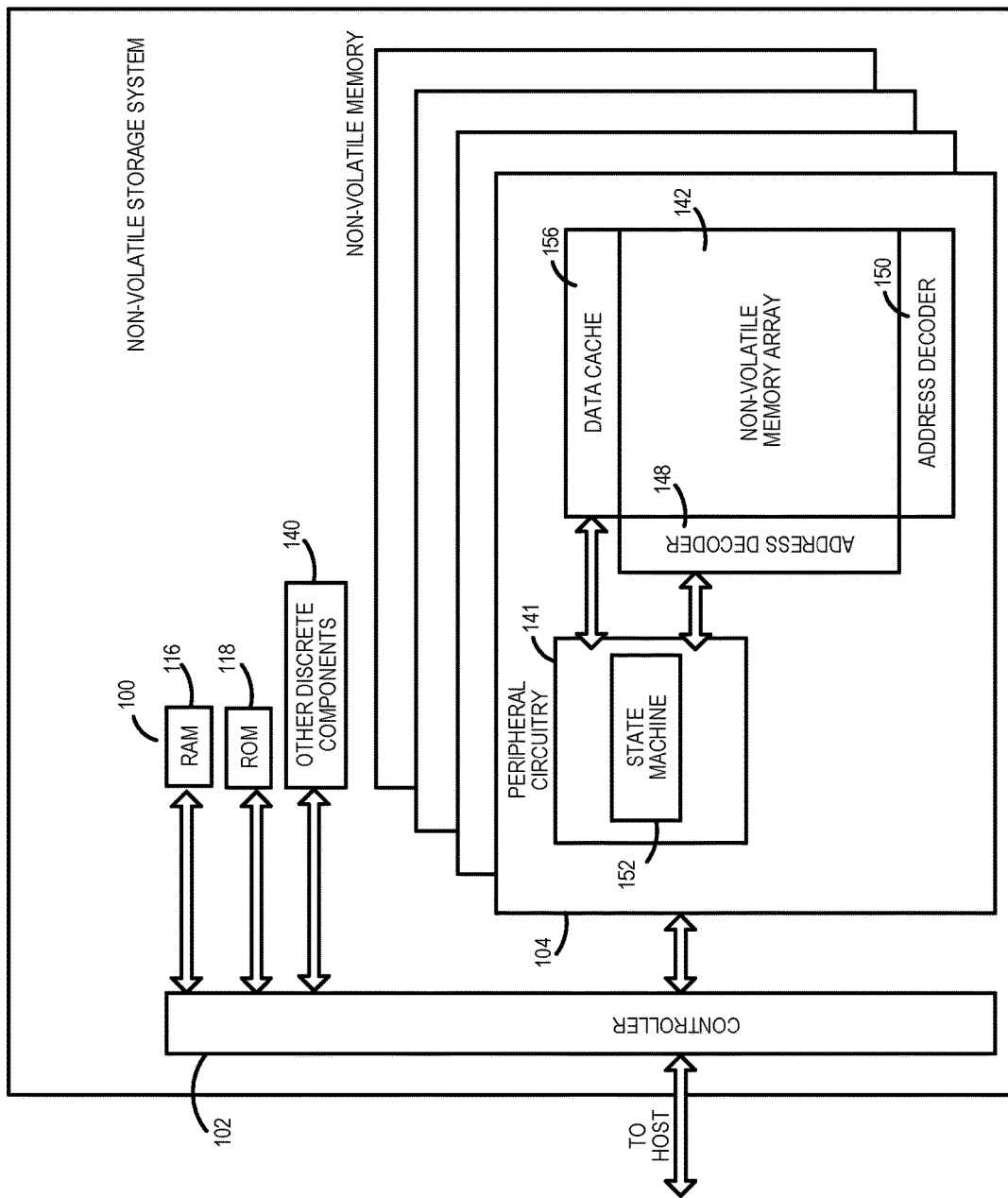
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
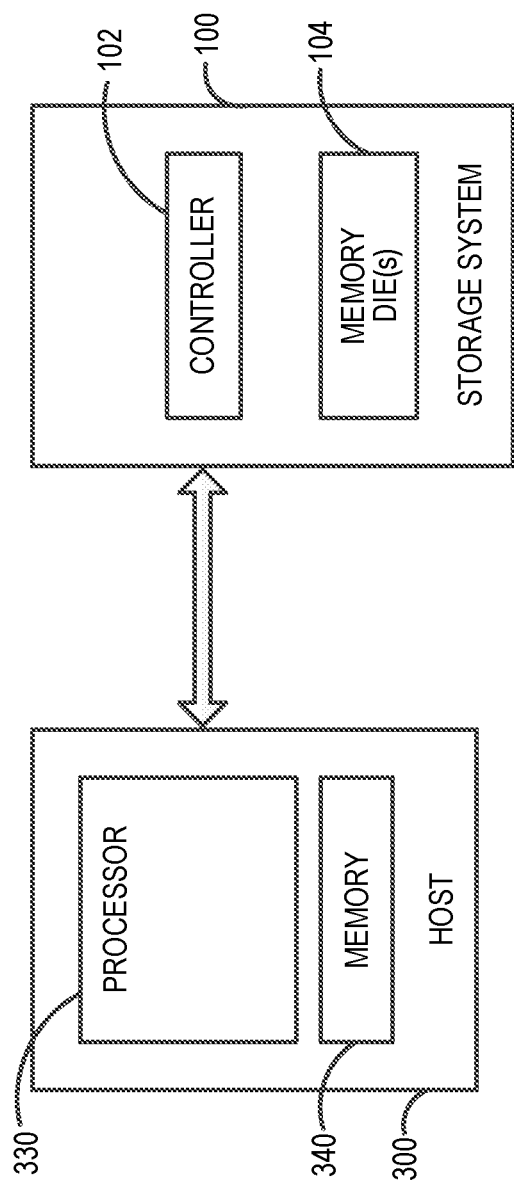
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device controller can use various data protection mechanisms to guarantee a low read-failure rate and that data returned to the host does not contain integrity errors. One such common mechanism in a Flash data storage device is exclusive-or (XOR) protection for block-or die-level recovery that is used in products with high capacity that require a low unrecoverable bit-error rate (UBER) or mean time between failures (MTBF). These elements can include error detection and correction on storage/memory elements located both in the data storage device controller and on the non-volatile memory dies. Connection issues between the controller and memory dies may cause integrity errors that are monitored and detected in the controller.

Figure 4:
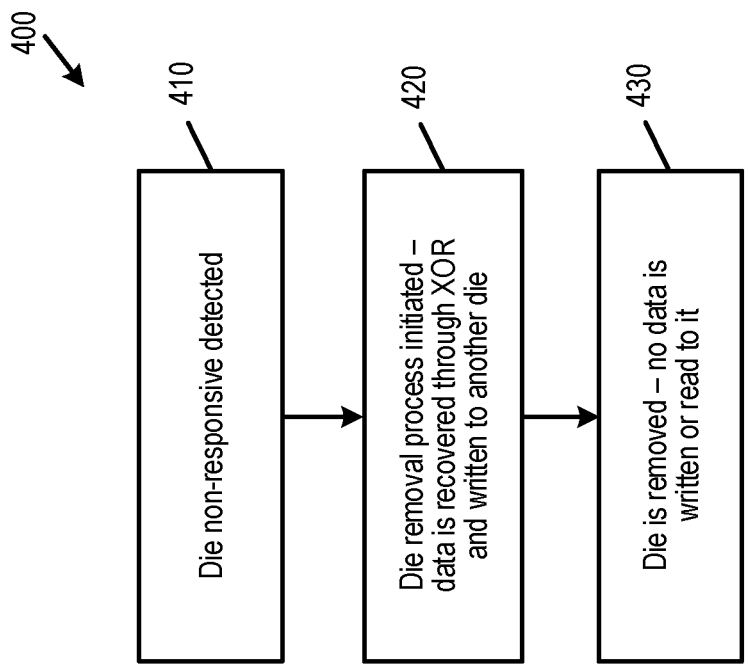
FIG. 4 is a flow chart of a method of an embodiment for die recovery.

When errors in memories are detected, a read failure often occurs when the data is deemed unrecoverable. In server-based Flash storage devices, when a die is non-responsive, it can be removed from the system, and an attempt to recover the data can be made through the XOR mechanism, which can cause a performance loss during the recovery process. This process is shown in the flow chart 400 in FIG. 4. As shown in FIG. 4, die non-responsiveness is detected (act 410). Then, a die removal processes is initiated, in which data is recovered through an exclusive-or (XOR) operation and written to another die (act 420). The end result is that the die is removed with no data written or read to it (act 430). As mentioned above, during the die removal process there might be a performance hiccup experienced by the host due to the significant amount of read recovery operations. In addition, depending on the number of removed dies, there can also be reduced overprovisioning (OP) and, as a result, performance degradation.

This recovery scheme may be applied only on very high capacity points that can afford losing a die. The reasoning for retiring the die when it is not responsive is that the recovery is attempted to be done on-the-fly with minimal impact to quality of service (QoS) for on-going input-output operations (IOs). Also, in some cases, there is no way to restore communication with the die. However, in many cases, the reason of the die being non-responsive is a transient corruption in its internal state-machine that may be cleared with a power cycle (i.e., turning the power to the memory off and on), and, afterwards, the component can function correctly without additional risk of data loss.

The following embodiments can be used to enhance the recovery of a memory element with an internal reset/power cycle of non-functionals memory die(s) through an agreed protocol with the host. This can result is a greatly-reduced chance of the negative impact of a die removal. For example, performing a hardware reset (e.g., power cycling or performing a hard reset) of a memory die can clear information stored in latches/cache of the memory die, state machine information, interface settings/information, etc. that can be corrupted and cause the memory die to fail. This can recover data storage device components (e.g., NAND dies) that methods, such as exclusive-or (XOR) or a software reset, cannot. This can also help reduce the number of retired dies and help improve performance, overprovisioning, and capacity.

In one embodiment, when a system element (e.g., a memory die) is non-responsive, the controller 102 in the data storage device 100 may try to reset it through a series of steps after establishing an agreement with the host 300. When a memory die 104 shows no response, through a handshake with the host 300, the controller 102 of the data storage device 100 may indicate its recovery attempt (e.g., alerting of a short IO-stall) but avoid the retirement of the subject die 104. This does not require the host 300 to run a power cycle or re-initialize the NVMe configuration. This also does not require the host 300 to clean the queued IOs of the drive. The host 300 may approve the usage of the enhanced recovery for each of the supported components (it may choose for which components it would support enhanced recovery).

Figure 5:
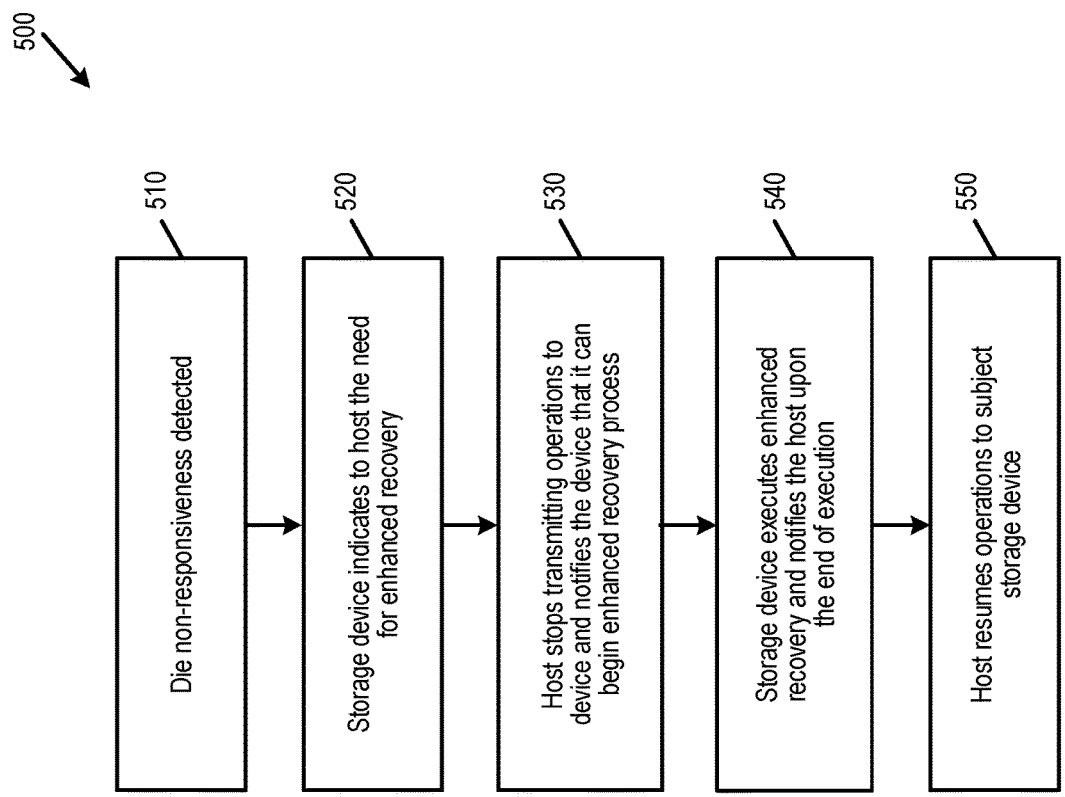
FIG. 5 is a flow chart of a method of an embodiment for an enhanced recovery operation.

This embodiment is illustrated in the flow chart 500 of FIG. 5. As shown in FIG. 5, after die non-responsiveness is detected (act 510), the controller 102 of the data storage device 100 indicates to the host 300 a need for enhanced recovery (act 520). In response, the host 300 stops transmitting operations to the memory die or accepts a greater latency and notifies the data storage device 100 that it can begin the enhanced recovery process (act 530). The controller 102 of the data storage device 100 then executes enhanced recovery by performing a hardware resent of the memory die 104 and notifies the host 300 upon the end of the execution (act 540). The host 300 then resumes operations the subject data storage device 100 (act 550).

As used herein, a "hardware reset" can refer to a power cycling operation or a hard reset that restores a component to the state it was in when it left the factory. With a hardware reset, settings, applications, and user data can be removed. In contrast, a "firmware (or soft) reset" can refer to a restart of a component to clear data from volatile memory and restart an application without shutting down the component completely.

So, in this embodiment, a handshake between the host 300 and the controller 102 happens when the controller 102 first notifies the host 300 of the need to execute enhanced recovery and that a certain memory die (or dies) will be unavailable (i.e., that the host 300 should avoid sending memory access commands to the non-responsive memory die(s) or accept a greater latency). In response, the host 300 can stop all memory access (IO) operations (e.g., read and/or write commands) to the memory die(s) undergoing a data-storage-device-driven reset. For example, the host 300 can get prepared to IO-stall (e.g., by waiting for completions of pending IOs and redirecting next IOs to other memory dies) and respond when it is ready for the controller 102 to execute the enhanced recovery operation to reset the memory die. The host 300 does not need to perform a power cycle or re-initialize the NVMe configuration, as the controller 102 can power-cycle the memory die itself. The host 300 also does not need to clear the queues. Once the enhanced recovery is done, the host 300 can continue as usual.

Also, in some memory architecture, such as NAND, a reset pin (or other type of communication channel) is shared between all the memory dies (e.g., when a pin-per-die or an address-based system may not be feasible given the large number of dies in device). Given that only a subset of memory dies (e.g., one) may need to be reset, a command can be sent to the other memory dies to ignore the reset pin. In this way, the controller 102 can direct a reset only to specific memory die(s). The non-functional die(s) cannot receive any commands, so the "ignore" command will only be received by the functional memory dies.

Figure 6:
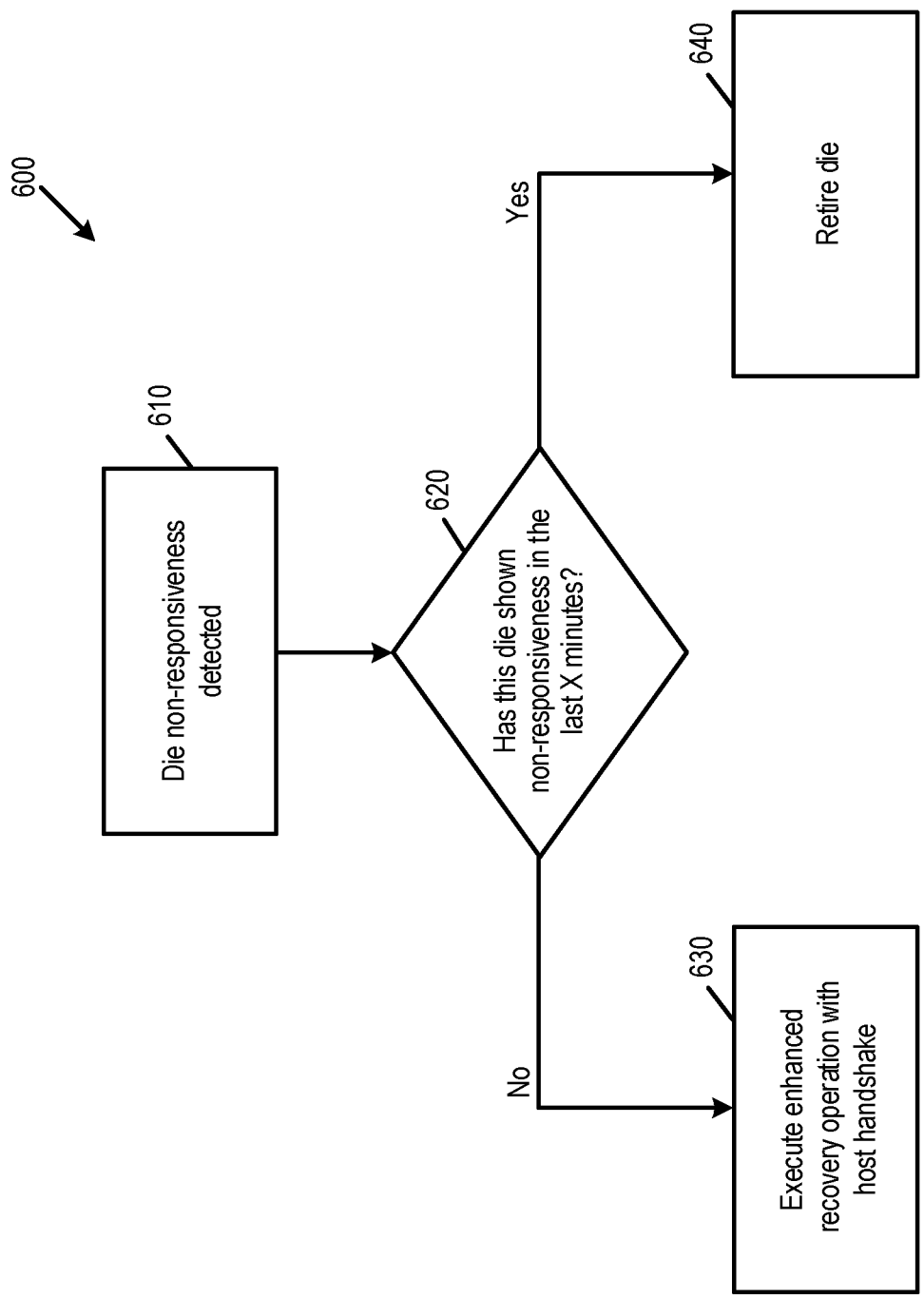
FIG. 6 is a flow chart of a method of an embodiment for an enhanced recovery operation.

In another embodiment, there can be some heuristic that the former protocol of retirement is triggered if a die exhibits "no-response" for several times in a certain period of time. This embodiment is shown in the flow chart 600 in FIG. 6. As shown in FIG. 6, after die non-responsiveness has been detected (act 610), the controller 102 determines whether the die has shown non-responsiveness over a period of time (e.g., in the last X minutes) (act 620). (Act 620 can be modified with another heuristic that considers irregular behavior of the subject die other than "no-response," such as irregular power, read/write latency profile, or any other characteristic that indicates that a component in the data storage device 100 is non-functional or is encountering a fault). If the die has not shown non-responsiveness over the period of time, the controller 102 executes the enhanced recovery operation with a host handshake (e.g., as shown in FIG. 5) (act 630). However, if the die has shown non-responsiveness over the period of time, the controller 102 retires the die (act 640).

In another embodiment, other elements inside the storage controller 102 may trigger an enhanced recovery operation. For example, dynamic random access memory ("DRAM"), electrically erasable programmable read only memory ("EEPROM"), or parts of the ASIC itself may be turned off and on (or reset) to restore a memory-or interface-related transient error. Also, enhanced recovery may be applied to non-memory-die/memory elements, such as, but not limited to, capacitors or system management bus (SMBus) controllers. Further, enhanced recovery can be enabled or disabled by the host 300 for each of these components separately, potentially based on the expected IO-stall duration reported by the data storage device 100. The host 300 may also direct the drive to apply the recovery internally without additional notification to the host 300.

When the storage controller 102 identifies a problem with a recoverable component, it can check whether the host 300 has enabled an enhanced recovery for the corresponding component. According to the component, it may arrange the execution of the recovery operation. For example, if the DRAM is not accessible in the corresponding period, the controller 102 can still access the local storage if there are some urgent host operations to be completed.

Figure 7:
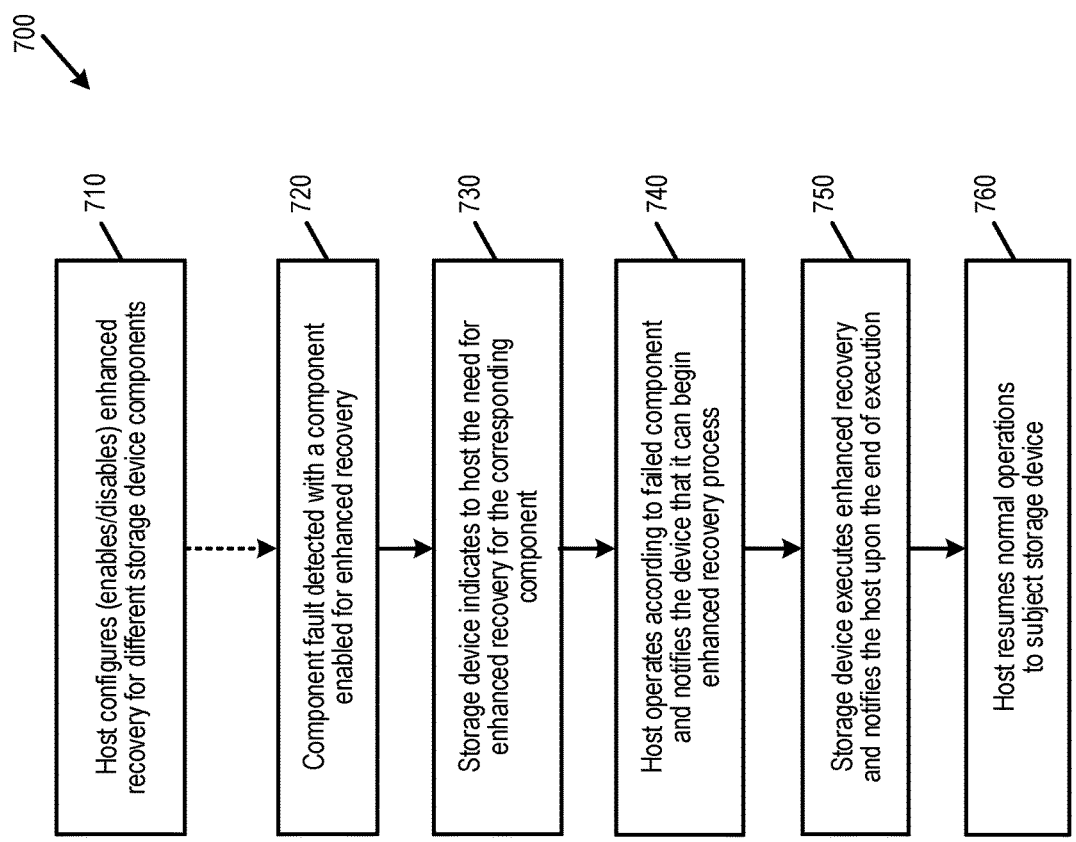
FIG. 7 is a flow chart of a method of an embodiment for an enhanced recovery operation based on various components.

FIG. 7 presents a flow chart 700 that illustrates this embodiment. As shown in FIG. 7, the host 300 configures (enables/disables) the enhanced recovery for different data storage device components (act 710). A component fault is detected with a component enabled for enhanced recovery (act 720). The controller 102 of the data storage device 100 then indicates, to the host 300, the need for enhanced recovery for the corresponding component (act 730). The host 300 operates according to the failed component and notifies the data storage device 100 that it can begin the enhanced recovery process (act 740). The controller 102 of the data storage device 100 then executes the enhanced recovery and notifies the host 300 upon the end of the execution (act 750). The host 300 then resumes normal operations to the data storage device 100 (act 760).

So, in this embodiment, the host 300 configures the components and potentially the corresponding allowed recovery duration, which may also determine whether the controller 102 initiates the enhanced recovery handshake depending on the nature of the fault. Then, upon detecting fault with a component that is approved for enhanced recovery by the host 300, the controller 102 can initiate the handshake process with the host 300. The reaction operations by the host 300 can depend on the nature of the faulty component in act 740 in FIG. 7.

There are several advantages associated with these embodiments. For example, the embodiments can reduce the number of retired dies, improving performance, overprovisioning and capacity, improving our storage devices in high end server products.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a plurality of memory dies; and
    a processor configured to communicate with the plurality of memory dies and further configured to:
        in response to determining that a subset of the plurality of memory dies is non-responsive, inform a host that the data storage device will perform a hardware reset on the subset of the plurality of memory dies;
        in response to receiving an acknowledgment from the host, perform the hardware reset on the subset of the plurality of memory dies by:
            sending a command to all memory dies of the plurality of memory dies to ignore a hardware reset command, wherein because the subset of the plurality of memory dies is non-responsive, the subset of the plurality of memory dies does not receive the command to ignore the hardware reset command; and
            sending the hardware reset command on a communication channel shared by the plurality of memory dies; and
        inform the host after the hardware reset on the subset of the plurality of memory dies has been performed.

2. The data storage device of claim 1, wherein the hardware reset is initiated by the data storage device and not the host.

3. The data storage device of claim 1, wherein the subset of the plurality of memory dies is hardware reset without clearing host input-output queue(s) for the subset of the plurality of memory dies.

4. The data storage device of claim 1, wherein the processor is further configured to receive, from the host, a memory access command redirected from the subset of the plurality of memory dies to another memory die of the plurality of memory dies.

5. The data storage device of claim 1, wherein the processor is further configured to:
    determine whether the subset of the plurality of memory dies was found to be non-responsive more than a threshold number of times over a time period;
    in response to determining that the subset of the plurality of memory dies was not found to be non-responsive more than the threshold number of times over the time period, perform the hardware reset on the subset of the plurality of memory dies; and
    in response to determining that the subset of the plurality of memory dies was found to be non-responsive more than the threshold number of times over the time period, retire the subset of the plurality of memory dies.

6. The data storage device of claim 1, wherein the processor is further configured to inform the host that the data storage device will perform the hardware reset in response to determining that the host has enabled an enhanced recovery operation.

7. The data storage device of claim 1, wherein the subset of the plurality of memory dies comprises a single memory die.

8. The data storage device of claim 1, wherein the subset of the plurality of memory dies comprises more than one memory die.

9. The data storage device of claim 1, wherein the plurality of memory dies comprises three-dimensional memory dies.

10. A method comprising:
performing the following in a data storage device in communication with a host:
determining that a component in the data storage device needs to be hardware reset;
informing the host that the data storage device will perform a hardware reset of the component;
performing the hardware reset of the component; and
informing the host after the hardware reset of the component has been performed;
wherein the data storage device determines that the component needs to be hardware reset in response to determining that the component exhibits irregular power usage.

11. The method of claim 10, wherein the component comprises a memory die.

12. The method of claim 10, wherein the component comprises part of a controller of the data storage device.

13. The method of claim 10, wherein the component comprises dynamic random access memory (DRAM).

14. The method of claim 10, further comprising receiving an instruction from the host to enable functionality in the data storage device to hardware reset the component.

15. The method of claim 10, wherein the component is hardware reset by the data storage device and not the host.

16. The method of claim 10, wherein the component comprises electrically erasable programmable read only memory (EEPROM).

17. The method of claim 10, wherein the component comprises a component in an application specific integrated circuit (ASIC).

18. The method of claim 10, wherein the component comprises a capacitor.

19. The method of claim 10, wherein the component comprises a bus controller.

20. A data storage device comprising:
a plurality of memory dies; and
means for:
in response to determining that a subset of the plurality of memory dies is non-responsive and that the host has enabled an enhanced recovery operation, informing a host that the data storage device will perform a hardware reset on the subset of the plurality of memory dies;
in response to receiving an acknowledgment from the host, performing the hardware reset on the subset of the plurality of memory dies; and
informing the host after the hardware reset on the subset of the plurality of memory dies has been performed.

* * * * *